(No Model.) 2 Sheets—Sheet 1.
N. E. POWERS.
METHOD OF MAKING CAPE COLLARS.

No. 408,850. Patented Aug. 13, 1889.

WITNESSES:
Frank C. Curtis
John T. Booth.

INVENTOR:
Noel E. Powers
by Geo. Auwoka
Atty.

(No Model.) 2 Sheets—Sheet 2.

N. E. POWERS.
METHOD OF MAKING CAPE COLLARS.

No. 408,850. Patented Aug. 13, 1889.

WITNESSES:
Frank C. Curtis
John T. Booth

INVENTOR:
Noel E. Powers
by Geo. A. Mosher
Atty.

UNITED STATES PATENT OFFICE.

NOEL E. POWERS, OF LANSINGBURG, ASSIGNOR TO WILBUR, MILLER & WILBUR, OF TROY, NEW YORK.

METHOD OF MAKING CAPE-COLLARS.

SPECIFICATION forming part of Letters Patent No. 408,850, dated August 13, 1889.

Application filed June 17, 1889. Serial No. 314,554. (No model.)

*To all whom it may concern:*

Be it known that I, NOEL E. POWERS, a resident of Lansingburg, in the county of Rensselaer and State of New York, have invented certain new and useful Improvements in Methods of Making Cape-Collars; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in the method of making cape-collars having extension facings extending from the collar proper down onto the cape, hereinafter described and subsequently claimed.

Such improvements were mostly shown and described in my application for a patent for improvements in cape-collars filed in the United States Patent Office April 11, 1889, and given the serial number 306,788, which application is now pending, and to which reference may be had in connection with the following description.

Figure 1:
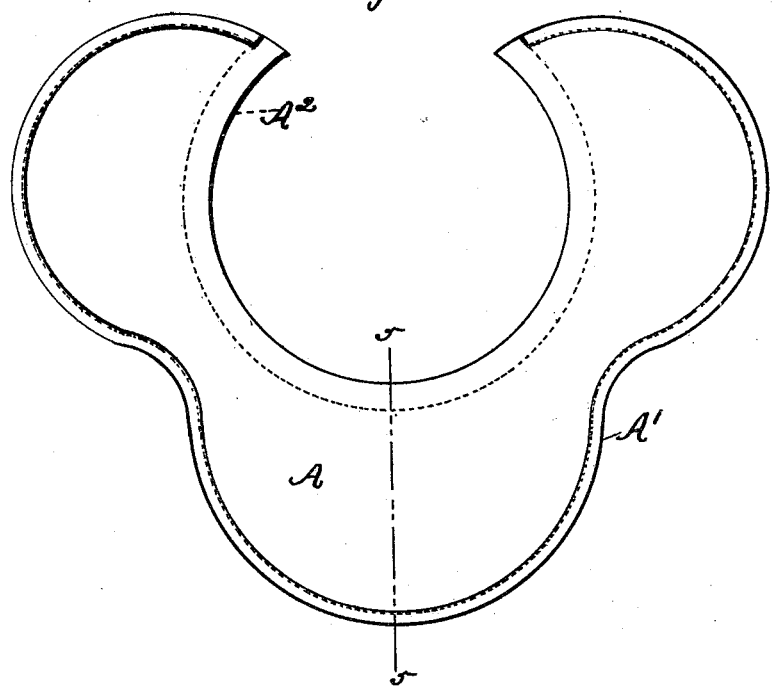
Figure 2:
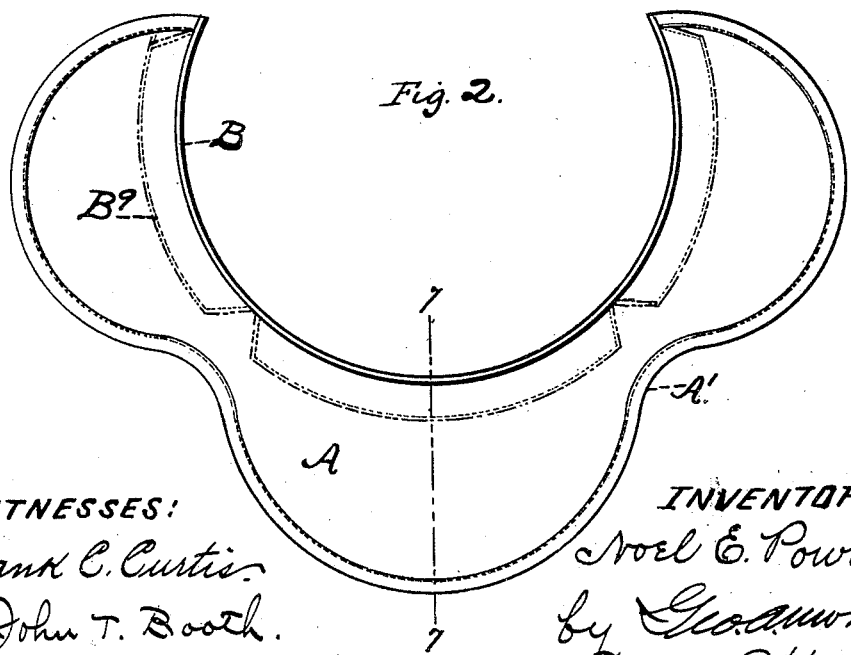
Figure 3:
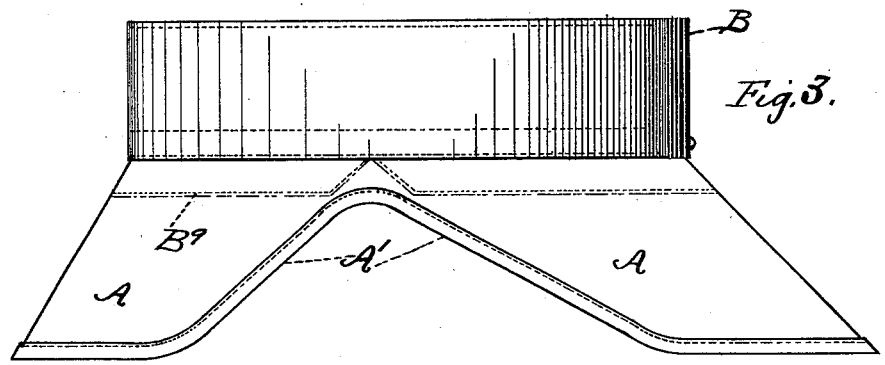
Figure 4:
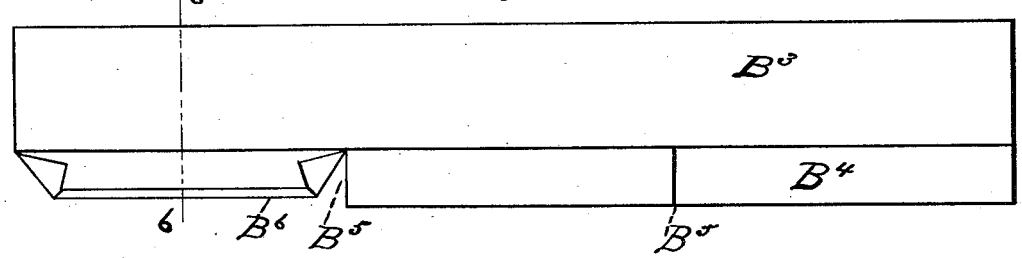
Figure 5:
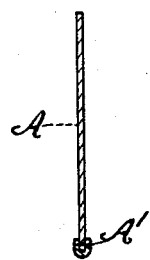
Figure 7:
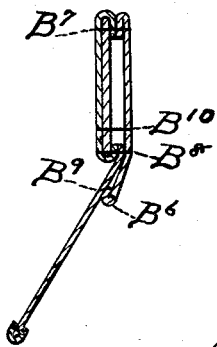
Figure 6:
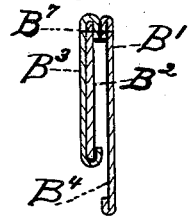

Figure 1 of the drawings is a top plan view of the cape detached from the collar proper or top part and laid out flat. Fig. 2 is a similar view with the cape attached to form the complete collar. Fig. 3 is a view in side elevation, upon a slightly enlarged scale, of the completed collar, showing the relative position of the parts while in use upon the neck of the wearer. Fig. 4 is a view in side elevation of the outer or face side of the top part of the collar, showing the inside ply extended below its lower edge, divided into three sections by slits or notches, and edge-folded. Fig. 5 is a view in cross-section of the cape, taken on the line 5 5 in Fig. 1. Fig. 6 is a similar view of the top part, taken on the line 6 6 in Fig. 4. Fig. 7 is a similar view of the finished collar, taken on the line 7 7 in Fig. 2.

The cross-sectional views are somewhat exaggerated in form and size for convenience in illustration.

The top part or collar proper may be of any known form of lady's collar made up of two or more strips or plies of fabric, but having one ply wider than the top part, so that it projects below its lower edge. The cape part serves to hold the top part in position upon the neck of the wearer, and is concaved on its inner edge, which edge is secured to the top part to give the cape a "flare" or projection angular to the top part. The plies forming the top part are made approximately straight, and if curved at all are curved in a direction opposed to the direction of the curve in the cape part, which would have the same effect upon the angular position or flare of the cape as increasing the degree of curvature in the concaved edge of the cape would have.

A is the cape, which may have a binding-strip A' around its outer edge. Its inner edge is concaved to form the sharp curve described by the circular line $A^2$. The collar proper or top part B is shown formed of three plies B', $B^2$, and $B^3$. The plies B' and $B^3$ are turned in at their upper edge, and all three plies secured together by a line of stitching $B^7$. The ply B' is made wider than the others to form an extended or cape-lapping portion $B^4$, which may be divided into sections by slits or notches $B^5$, and has its projecting or cape-lapping edges finish-folded, as shown at $B^6$. The inner concaved edge of the cape part is then inserted between the lower folded-in edges of plies B' and $B^3$, as shown in Fig. 7, and secured therein by a line of stitching $B^8$. The approximately straight edge of the extended cape-lapping ply is then secured to the cape part by the line of stitching $B^9$ inserted along the edge of the extended ply.

When desired, the several plies of the top part may be additionally secured by a line of stitching $B^{10}$.

As the approximately straight cape-lapping edge of the extended ply is guided by the sewing-machine operator to insert the curved line of stitching $B^9$ substantially parallel with the inner concaved edge of the cape part, such edge is subjected to a tension force applied on a line running longitudinally of the edge, and by which force the cape-lapping portion of the extended ply is slightly stretched and the cape part is subjected to a tension force applied on lines running transversely of the cape and angular to the direction-lines of the tension force applied to the lapping edge, by which the cape part is slightly fulled.

I prefer to divide the cape-lapping portion into sections, as by the slits or notches B⁵, as less stretching and fulling of the parts are then required.

When the cape-lapping extension is cut on the bias, the division can be dispensed with.

By means of my improved method of making cape-collars I am able to easily and cheaply re-enforce the cape, and at the same time present a smooth finished surface on the side of the collar which comes in contact with the neck.

What I claim as new, and desire to secure by Letters Patent, is—

In a cape-collar consisting of a top part composed of a plurality of approximately straight edge plies, one of which extends below its lower edge, and a cape part having a concaved edge secured to the lower edge of the top part, the herein-described method of securing the extended ply to the cape part, which consists of inserting a line of stitching through the cape-lapping edge of the extended ply and the cape, and at the same time subjecting such edge to longitudinally-applied tension and the cape to transversely-applied tension, the direction-lines of tension force applied to the cape being angular to those of the tension force applied to the extended edge, substantially as described.

In testimony whereof I have hereunto set my hand this 14th day of June, 1889.

NOEL E. POWERS.

Witnesses:
GEO. A. MOSHER,
FRANK C. CURTIS.